US007479898B2

(12) United States Patent
Barnhart et al.

(10) Patent No.: US 7,479,898 B2
(45) Date of Patent: Jan. 20, 2009

(54) SYSTEM AND METHOD FOR SYNCHRONIZING LIGHTS POWERED BY WILD FREQUENCY AC

(75) Inventors: Brian J. Barnhart, New Carlisle, OH (US); Charles A. Roudeski, Springfield, OH (US)

(73) Assignee: Honeywell International Inc., Morristown, NJ (US)

( * ) Notice: Subject to any disclaimer, the term of this patent is extended or adjusted under 35 U.S.C. 154(b) by 574 days.

(21) Appl. No.: 11/315,237

(22) Filed: Dec. 23, 2005

(65) Prior Publication Data

US 2007/0146168 A1 Jun. 28, 2007

(51) Int. Cl.
*B64D 47/06* (2006.01)
*G08B 5/00* (2006.01)
*G08B 5/36* (2006.01)

(52) U.S. Cl. .................... 340/981; 340/331; 340/815.75

(58) Field of Classification Search ............ 340/815.75, 340/331, 981
See application file for complete search history.

(56) References Cited

U.S. PATENT DOCUMENTS 4,613,797 A 9/1986 Eggers et al.
4,928,055 A 5/1990 Kaieda et al.
4,937,720 A * 6/1990 Kirchberg .................... 363/41
4,977,492 A * 12/1990 Kirchberg et al. ............. 363/41
5,078,039 A 1/1992 Tulk et al.
5,319,367 A 6/1994 Schulte et al.
5,659,287 A * 8/1997 Donati et al. ............... 340/331
5,844,540 A 12/1998 Terasaki
6,078,145 A 6/2000 Tillinghast et al.
2004/0155844 A1 8/2004 Stopa
2004/0183469 A1* 9/2004 Lin et al. ..................... 315/247
2005/0012467 A1* 1/2005 Nemirow et al. ............ 315/247
2006/0007012 A1* 1/2006 Machi et al. ........... 340/815.45

* cited by examiner

*Primary Examiner*—Jeff Hofsass
*Assistant Examiner*—Jack Wang
(74) *Attorney, Agent, or Firm*—Black Lowe & Graham PLLC

(57) ABSTRACT

Flashing lights powered by a common wild frequency power source (40) are synchronized with respect to flash rate and duration. Each lighthead includes a power supply device (1), which includes a timing signal generator (30) and a synchronization device (5). The timing signal generator (30) includes a precision clock (310), which generates a timing signal to regulate the flashing operation of the corresponding light. The synchronization device recurrently causes the timing signal to be reset in accordance with the wild frequency power source signal. By recurrently resetting the timing signal of each light according to a common wild frequency source, the flashing of the lights can be synchronized without transferring synchronization signals between the lights.

20 Claims, 4 Drawing Sheets

SYSTEM AND METHOD FOR SYNCHRONIZING LIGHTS POWERED BY WILD FREQUENCY AC

FIELD OF THE INVENTION

The present invention relates to the synchronization of multiple flashing lights and, more particularly, to the synchronization of multiple flashing lights powered by a common "wild frequency" power source.

BACKGROUND OF THE INVENTION

For certain applications, it is desirable to have multiple lights flash in synchronization. For example, on an aircraft, it is desirable to have the anti-collision lights aircraft flash at the same time for purposes of safety and aesthetics. In an aircraft's anti-collision lighting system, each lighthead typically has a power supply that connects to the aircraft's 115 V/400 Hz bus. By using a common AC bus as a timing reference, the anti-collision lights automatically flash together. For this reason, the flash rate is directly proportional to the aircraft's generator frequency, which is usually well controlled.

Recently, however, aircraft have been introduced with wild frequency power where the AC frequency can be anywhere between 360 and 800 Hz. Because a flash rate variation of 220% is unacceptable, some means of synchronization is required.

One existing solution for synchronization, often used for aircraft whose anti-collision lights are powered by a 28 VDC system, is for each power supply to provide its own timing and "sync" signal. In such systems, a sync wire connects all of the lighting units, allowing the fastest unit to signal the others when to flash.

A wireless version of this existing solution uses a high-frequency "carrier" signal on the AC line as the sync signal. This requires a carrier send/receive circuit in each lighting unit and a single filter unit to keep the carrier off the aircraft's main AC bus.

Another existing alternative is to connect each of the lighting units to a dedicated synchronization controller. This solution is available if single-point-failure is tolerable, and rewiring of the aircraft is allowed.

However, it would be advantageous to dispose of any requirement of installing synchronization wires, injecting synchronization signals onto an AC bus, or installing a separate filter or controller unit. This would simplify the synchronization of flashing lights, such as anti-collision lights, which are powered by a wild frequency source.

SUMMARY OF THE INVENTION

Exemplary embodiments of the present invention provide a system and method for synchronizing the flashing of multiple lights powered by a common wild frequency AC source.

According to an exemplary embodiment, the present invention provides a timing signal for each of the lights to regulate the flashing operation. A precision clock, such as a crystal-controlled oscillator, may be used to generate the timing signal for each light. The timing signal may be reset or "updated' in accordance with the wild frequency source signal. Thus, the flashing operation of each light is independently updated according to the same wild frequency source signal, thereby allowing the lights to be synchronized without synchronization signals between the lights.

According to an exemplary embodiment, a device is provided for each of the flashing lights to generate the timing signal. For instance, a power supply device, which supplies power to each light from the wild frequency power source signal, may be configured to generate the timing signal.

According to a particular exemplary embodiment, the flashing lights may be installed as anti-collision lights of an aircraft, which are powered by the aircraft's wild frequency AC bus.

Further aspects in the scope of applicability of the present invention will become apparent from the detailed description provided hereinafter. However, it should be understood that the detailed description and the specific embodiments therein, while disclosing exemplary embodiments of the invention, are provided for purposes of illustration only.

DETAILED DESCRIPTION OF EXEMPLARY EMBODIMENTS

The present invention is directed to a system and method for synchronizing the operation of flashing lights, which are powered by a common wild frequency source.

As used in this detailed description, the terms "light" or "flashing light" refer to any set of two or more light sources that share a common interface to a wild frequency power source. Furthermore, the term "lighthead" refers to a device encompassing such a light, which may or may not incorporate the power supply device.

For example, each light may be comprised of a set of light-emitting diodes (LEDs) commonly connected to a power supply device to receive power from a wild frequency AC bus. In this example, the power supply device may be designed to regulate the LEDs to uniformly flash according to a particular rate and duration.

However, other types of light sources (e.g., xenon flashtubes, halogen lamps) may be implemented in each flashing light. Also, it is contemplated that different types of light sources may be implemented in different lights, which are synchronized according to an exemplary embodiment of the present invention. In another embodiment, it is further contemplated that different types of light sources may be implemented in the same light.

A common wild frequency AC source is used for powering multiple flashing lights. According to an exemplary embodiment, each lighthead includes a power supply device that supplies power to the corresponding light in such a manner as to regulate both flash rate and duration based on the wild frequency power source. By independently controlling the flashing operation of each of the lights in accordance with a common source, synchronization of the flashing lights may be achieved.

In a particular exemplary embodiment, the power supply device of each lighthead utilizes a precision oscillator (crystal, ceramic resonator, etc.) and counter to generate the timing signal. This timing signal controls the flashing operation, e.g., when and for how long each flash occurs. While the use of a precision oscillator allows the flash rate to be very precise, some drift will eventually occur if there is no synchronization. Thus, the power supply device generates a sync reset signal to update or reset the timing signal in accordance with the wild frequency source. Specifically, a clock signal is derived from the common wild frequency source in order to generate the sync reset signal. This clock signal is hereafter referred to as the sync reference signal.

According to this embodiment, all of the power supply devices of the respective lights are connected to the same wild frequency source and are switched on (i.e., energized) at the same time. As such, their sync reference signals may be synchronized regardless of the actual AC line frequency of the source.

Figure 1:
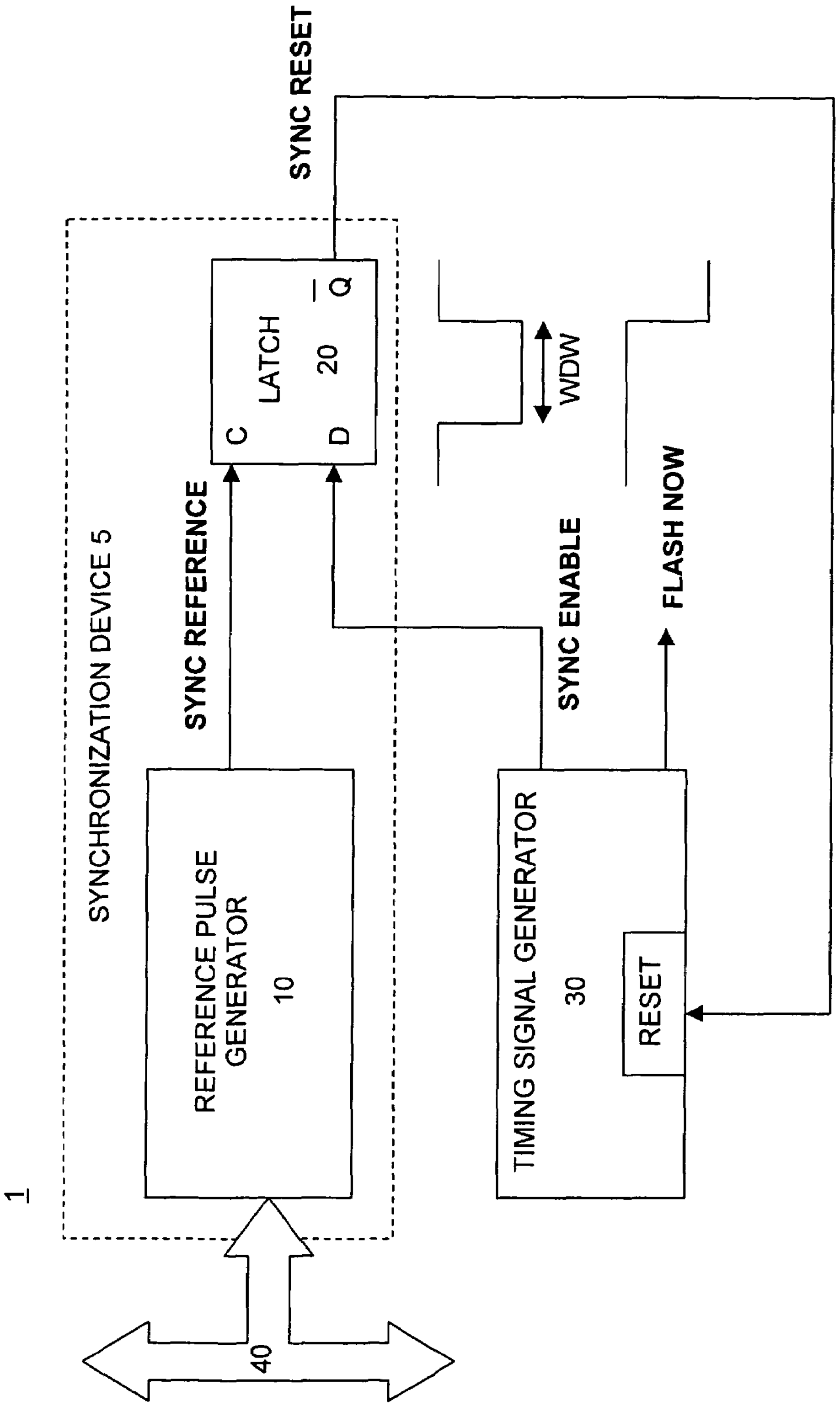
FIG. 1 is a block diagram illustrating a device that generates a sync reset which updates a timing signal generator for regulating a flashing light, according to an exemplary embodiment of the present invention.

FIG. 1 is a block diagram illustrating a power supply device 1 configured to control the flashing operation of a light, according to an exemplary embodiment. As shown in FIG. 1, the powers supply device 1 includes a timing signal generator 30, which generates the timing signal (not shown) for regulating or controlling the flashing operation of the corresponding light (not shown). For instance, as illustrated in FIG. 1, the timing signal generator 30 may output a flash now signal, which causes the light to illuminate when the flash now signal is at a high logic level.

FIG. 1 further illustrates a synchronization device 5 connected to the timing signal generator 30. The synchronization device 5 includes a reference pulse generator 10, which generates the sync reference signal. As shown in FIG. 1, a wild frequency AC power source 40 may be connected to the reference pulse generator 10. As will be explained in further detail below in relation to FIGS. 2 and 2A, the reference pulse generator 10 derives the sync reference signal from this wild frequency power source 40.

According to an exemplary embodiment, the wild frequency power source 40 may be embodied in an AC bus connected to multiple power supply devices 1. For example, in a particular application where the present invention is used for synchronizing an aircraft's anti-collision lights, the wild frequency power source 40 may comprise the aircraft's 115 VAC bus.

Referring again to FIG. 1, the reference pulse generator 10 outputs the sync reference signal to the latch unit 20. The latch unit 20 also receives a sync enable signal from the timing signal generator 30. The timing signal generator 30 derives the sync enable signal from the generated timing signal.

For example, the latch unit 20 may be comprised of a D-type latch, as illustrated in the figure. As will be described in further detail below, the latch unit 20 determines whether the signal from the wild frequency power source 40 aligns with the timing signal based on a relationship between the sync reference signal and the sync enable signal. In response to a determined alignment between the wild frequency power source signal and the timing signal, the latch unit 20 outputs a sync reset signal to reset the timing signal generator 30.

According to an exemplary embodiment, the sync enable signal is indicative of a time window of predetermined duration WDW in relation to the occurrence of a flash. Because the occurrence of a flash is represented by the flash now signal transitioning, the time window WDW is related to the transitioning of the flash now signal. For instance, according to the embodiment illustrated in FIG. 1, the time window WDW is a predetermined period of time immediately prior to (and concluding upon) the end of the flash, i.e., the transitioning of the flash now signal to low. However, in an alternative embodiment, the time window WDW may commence immediately after the occurrence of a flash, i.e., the transitioning of the flash now signal to low level.

The operation of the power supply device 1 illustrated in FIG. 1 will be described in more detail below. In describing the operation, reference will be made to FIGS. 2, 2A, 3, and 3A. It should be noted that these figures are provided for purposes of illustration only and are not necessarily limiting on the present invention. Also, the functional blocks illustrated in these figures may be implemented by any configuration of hardware (processors, logic circuitry, etc.), software, or "firmware," or any combination thereof.

Figure 2:
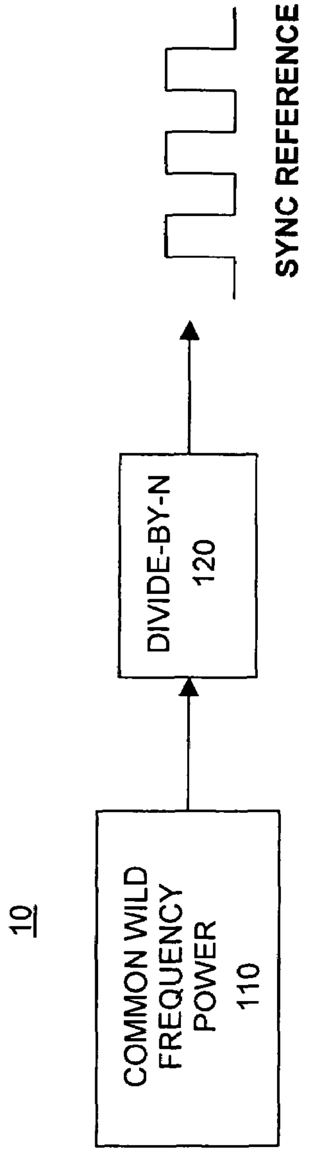
FIG. 2 is a block diagram more particularly illustrating a sync reference pulse generator, as shown in FIG. 1, according to an exemplary embodiment of the present invention.

According to an exemplary embodiment, the sync reference signal may be comprised of a series of pulses derived from the AC signal from the wild frequency power source 40. FIG. 2 is a block diagram illustrating the functional units of the reference pulse generator 10, which generates the sync reference signal. As illustrated in FIG. 2, the reference pulse generator 10 includes a wild frequency power interface 110, for receiving the signal from the wild frequency power source 40. The received wild frequency power source signal is divided down by the divide-by-N unit 120 in order to obtain a square-wave signal, i.e., the sync reference signal. Thus, assuming that the wild frequency power source 40 has a frequency $F_W$, the reference signal generator 10 will generate the sync reference signal by outputting pulses at a frequency of about $F_W/N_S$. In a particular exemplary embodiment, the divide-by-N unit 120 can be designed so that the frequency ($F_W/N_S$) of the sync reference signal pulses are slower than the flash rate of the light at the lowest line frequency for the aircraft.

Figure 2A:
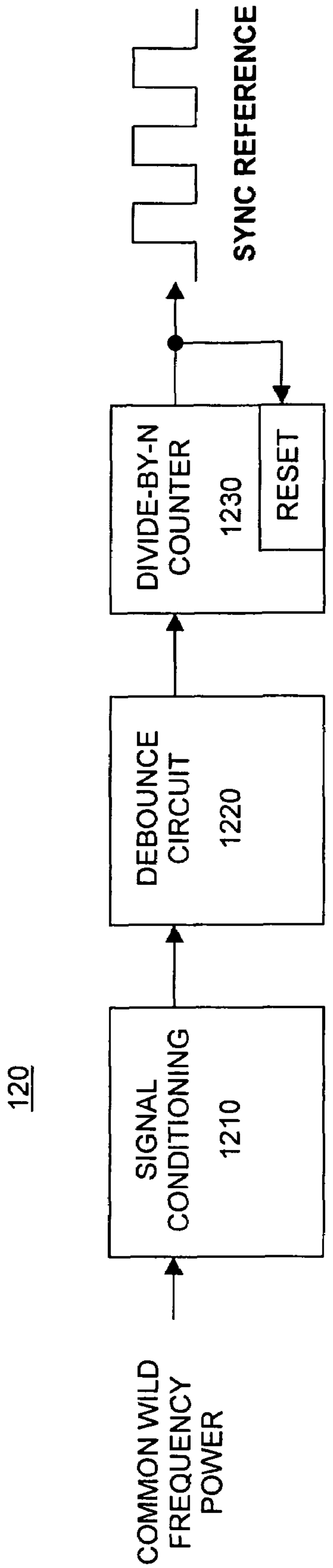
FIG. 2A is a block diagram more particularly illustrating a divide-by-N unit, as shown in FIG. 2, according to an exemplary embodiment of the present invention.

FIG. 2A is a more detailed illustration of an implementation of the divide-by-N unit 120, according to an exemplary embodiment. As shown in this figure, the signal conditioning unit 1210 may perform any necessary conditioning on the received wild frequency power source signal. According to an exemplary embodiment, the debounce circuit 1220 detects each time that the conditioned signal crosses a threshold, which triggers a debounce routine so that for a given level detection only one pulse is derived even in the presence of severe line noise. The principles of operation of the debounce circuit 1220 will be readily apparent to those of ordinary skill in the art.

Further in FIG. 2A, the divide-by-N counter 1230 is designed to count the detected debounced signals, and output a high level pulse after N debounces are detected. Each pulse is output as part of the sync reference signal. As shown in FIG. 2A, each output pulse is also fed back to the divide-by-N counter 1230 in order to reset the count.

It should be noted that, in the exemplary embodiment described above in connection with FIGS. 2 and 2A, the frequency of resetting the sync enable signal is tied to the flash rate of the light. However, it should be noted that this is not a requirement for the present invention. In alternative embodiments, a higher or lower frequency for synchronization or resetting may be used.

Referring again to FIG. 1, the sync reference signal and the sync enable signal is received by the latch unit 20. The latch unit 20 is designed to latch onto instances where the reference pulse generator 10 starts producing a pulse (i.e., the sync reference signal rises) during the time window WDW component of the sync enable signal. When this occurs, the latch unit 120 outputs a sync reset signal to cause the timing signal generator 30 to reset the timing signal, which regulates the flashing operation.

As such, the latch unit 20 is operable to output the sync reset signal at a time when the timing signal coincides, or is aligned with, the wild frequency power source signal.

As described above, the sync enable signal is indicative of a time window WDW relative to the occurrence of a flash. According to an exemplary embodiment, this time window WDW may be a predetermined time at the end of each flash. For example, the time window WDW may be designed to be the 33 msec interval before the end of each flash (i.e., before the flash now signal transitions to low).

Figure 3:
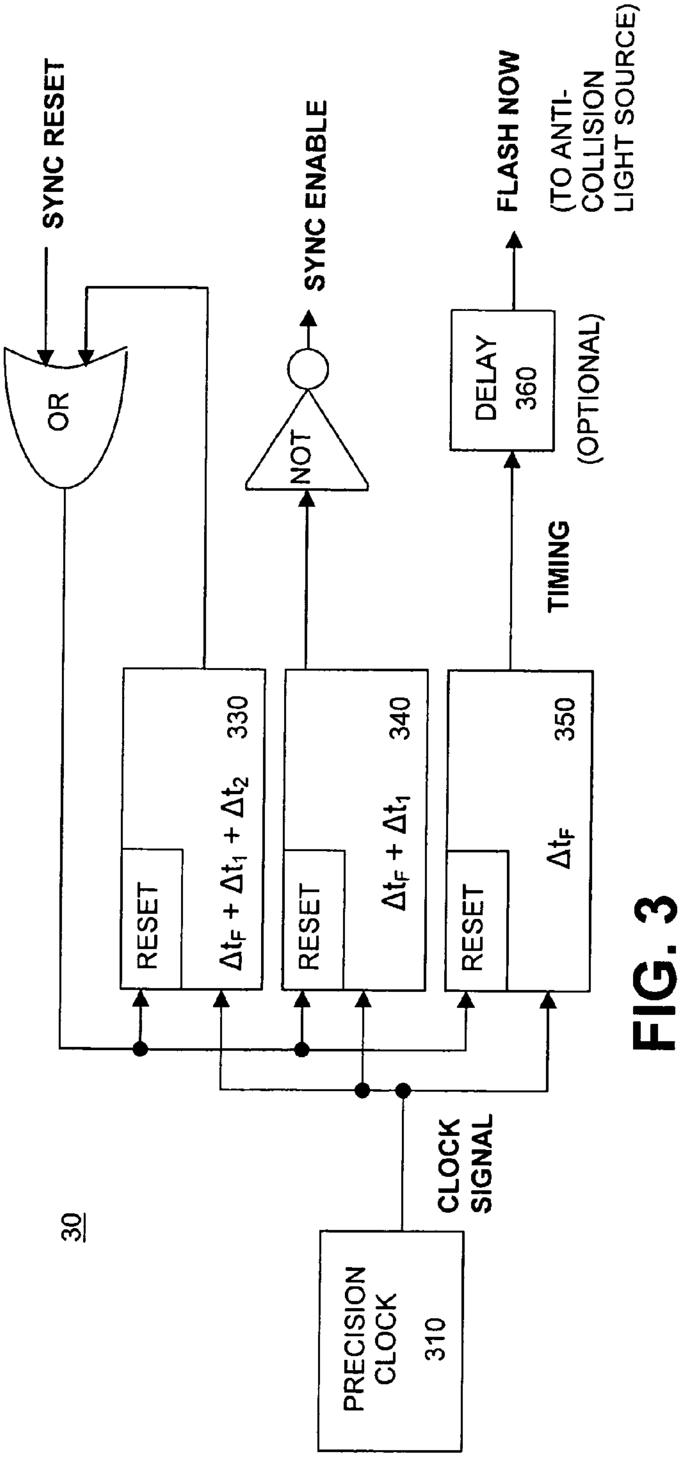
FIG. 3 is a block diagram more particularly illustrating a timing signal generator, as shown in FIG. 1, according to an exemplary embodiment of the present invention.

FIG. 3 provides a detailed illustration of the timing signal generator 30, in accordance with an exemplary embodiment where the time window WDW is a predetermined duration prior to flashing.

As shown in FIG. 3, a precision clock 310 is connected to timers 330, 340, and 350. Each of the timers 330-350 is triggered at a respective time after a reset occurs. In other words, after being reset, each of the timers 330, 340, and 350 is configured to "turn on" (output a high level voltage signal) after a respective time duration has elapsed. After being triggered, each of the timers 330-350 remains turned on until they are all reset by the same signal (i.e., until the timing signal generator 30 is reset).

As shown in FIG. 3, timer 350 produces the timing signal by turning on at a time $\Delta t_F$ after being reset. Timer 340 is configured to turn on at a time $\Delta t_1$ after timer 350 turns on (thus, timer 340 turns on $\Delta t_F+\Delta t_1$ after being reset). Timer 350 is configured to turn on at a time $\Delta t_2$ after timer 340 turns on (thus, timer 350 turns on $\Delta t_F+\Delta t_1+\Delta t_2$ after being reset).

FIG. 3 shows that the timing signal output by timer 350 may be sent to a delay unit 360 to be delayed by a predetermined amount of time. However, the delay unit 360 is optional and not required for proper synchronization. If no delay unit 360 is provided, the timing signal may be used as the flash now signal.

In the embodiment of FIG. 3, after the timers 330-350 are reset, the time $\Delta t_F+\Delta t_1$ represents the start of time window WDW of the sync enable signal, and $\Delta t_F+\Delta t_1+\Delta t_2$ represents the end of the time window WDW. Accordingly, the duration of time window WDW is $\Delta t_2$.

As shown in FIG. 3, the output of timer 340 is sent to a NOT logic gate in order to produce the sync enable signal, while the output of timer 330 is used for resetting the timers at the end of the time window WDW. Specifically, the output of both timers 340 and 350 will be set to high at $\Delta t_F+\Delta t_1$ after the reset. Thus, by inverting the output of timer 340 (via the NOT gate), the resultant signal will transition to low at the beginning of the time window WDW. Given that the output of timer 330 will transition to high at time $\Delta t_F+\Delta t_1+\Delta t_2$ after the reset, timer 330 may be used to reset the timers 330-350 (via the OR gate), thereby causing the sync enable signal to transition back to high at the end of time window WDW. Thus, a sync enable signal whose low-level state represents the time window WDW, as illustrated in FIG. 1, may be obtained.

According to this embodiment, the reset terminals of the respective timers 330-350 in FIG. 3 operate according to the same signals and, thus, collectively operate as the reset terminal for the timing signal generator 30 in FIG. 1. Thus, as shown in FIG. 3, the sync reset signal from the synchronization device 5 may be applied to each of the reset terminals of timers 330-350 in order to reset the timing signal generator 30 when the latch unit 20 determines that the wild frequency power source signal is aligned with sync enable signal. The latch unit 20 detects such alignment by latching during the rising edge of a sync reference pulse that occurs while the sync enable signal is in the low-level state.

Since both the sync reset signal and the output of timer 330 may be used for resetting the timers 330-350, FIG. 3 illustrates both of these signals being sent to a common OR logic gate, which in turn is connected to the respective reset terminals of timers 330-350. However, it will be readily apparent to those of ordinary skill in the art that the timing signal generator 30 may be implemented without the OR gate.

Referring to FIG. 3, after being delayed by the appropriate amount of time, the flash now signal may be used for causing the light source(s) (not shown) in the corresponding lighthead to flash. According to an exemplary embodiment, the flash now signal may be directly applied as the voltage source of each light source (e.g., in embodiments where each light source is an LED). In such an embodiment, the duration of each flashing may correspond to the pulse width of the flash now signal. For example, to achieve approximately 45 flashes per minute, the duration of each flash might be 295 ms. Thus, the timing signal generator 30 in FIG. 3 may be designed such that the flash now pulse width (i.e., $\Delta t_1+\Delta t_2$) is approximately equal to 295 ms.

However, in alternative embodiments, it is envisioned that the flash now signal may be a control signal that causes another circuit or device (not shown) to turn the light source (s) on and off. For instance, the flash now signal may trigger a counter or timing circuit (not shown) to provide a high-level voltage signal to the light source(s) for a particular duration, e.g., 10 msec. Other methods and embodiments for utilizing the flash now signal to control the timing and duration of each flash will be readily apparent to those of ordinary skill in the art.

Figure 3A:
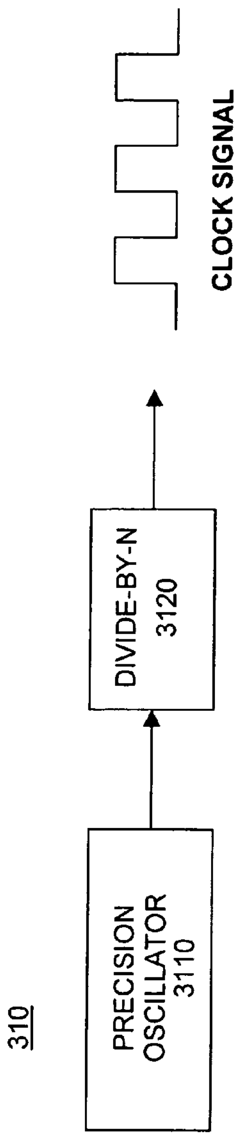
FIG. 3A is a block diagram more particularly illustrating a precision clock, as shown in FIG. 3, according to an exemplary embodiment of the present invention.

As described above, exemplary embodiments of the present invention utilize a clock signal generated by a precision clock 310. FIG. 3A provides a more detailed illustration of the precision clock 310. As shown in this figure, the precision clock 310 includes a precision oscillator 3110 whose signal is sent to a divide-by-N unit 3120. In such an embodiment, the divide-by-N unit 3120 is designed to divide down the signal from the precision oscillator 3110 in order to set frequency of the clock signal to an appropriate rate. Assuming that the precision oscillator signal is $F_O$, the divide-by-N unit 3120 may be designed to generate a square-wave signal with a frequency of $F_O/N_C$. For example, the precision clock 310 may be designed to generate the clock signal with a frequency ($F_O/N_C$) of the nominal flash rate.

Figure 3B:
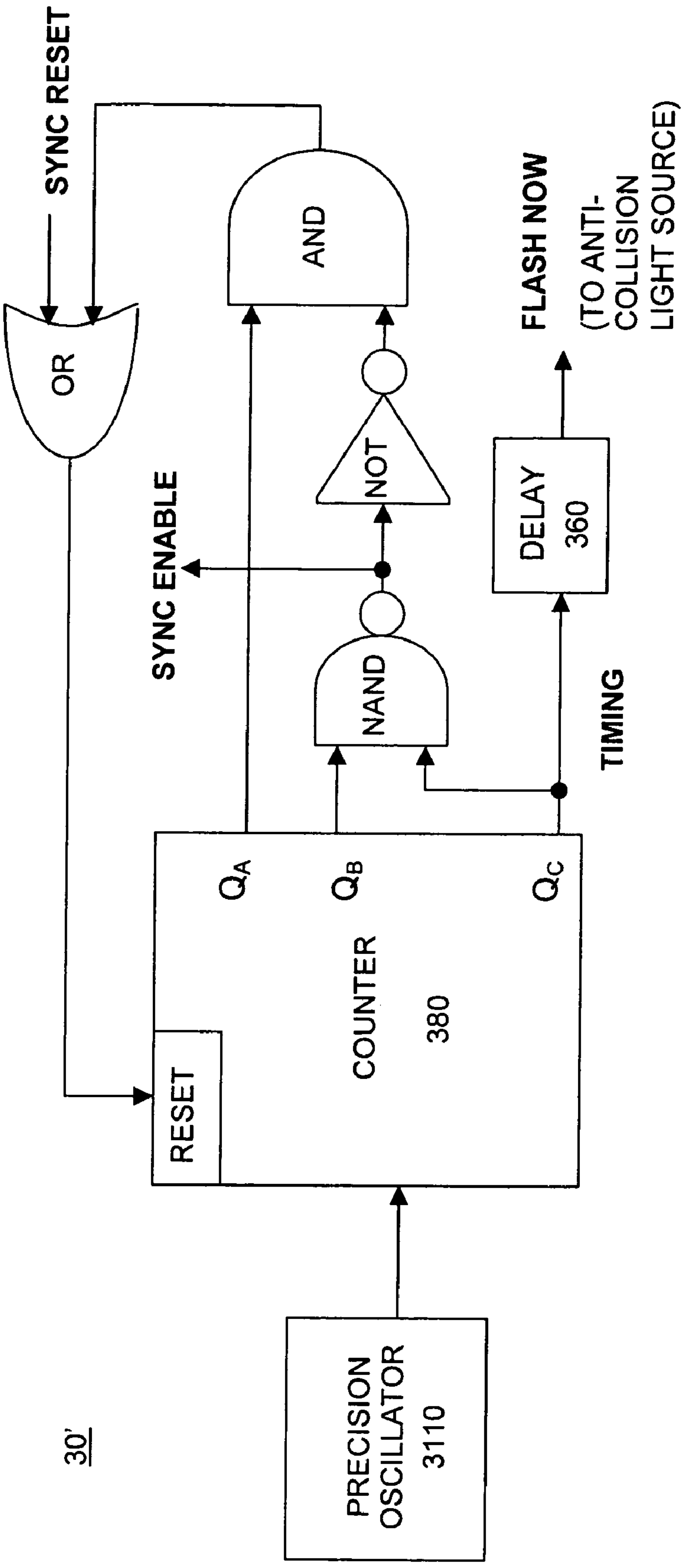
FIG. 3B is a block diagram illustrating a particular implementation of a timing signal generator, as shown in FIGS. 1 and 3, which utilizes a counter, according to an exemplary embodiment of the present invention.

In a particular exemplary embodiment, a particular implementation of the timing signal generator 30 may use one or more counters. FIG. 3B illustrates a timing signal generator 30' in which the outputs of a digital counter 380 are used to generate the timing and sync enable signals. The counter 380 may be embodied as one or more integrated circuits (ICs), or a combination of flip-flop circuits, or any other combination of hardware and/or software.

Since the principles of operation of a counter are readily understood by those of ordinary skill in the art, a detailed explanation of these principles need not be provided here. Suffice it to say that the three outputs ($Q_A$, $Q_B$, and $Q_C$) of the counter 380 in FIG. 3B may be used to generate signals at frequencies of $\Delta t_F$, $\Delta t_1$, $\Delta t_2$, respectively (assuming that $\Delta t_F$ is a multiple of $\Delta t_1$, and that $\Delta t_1$ is a multiple of $\Delta t_2$).

As shown in FIG. 3B, the signal from a precision oscillator 3110 may be directly input to the counter 380. The $Q_C$ output of the counter 380 is used as the timing signal to be sent to delay unit 360 (optional) to generate the flash now signal.

Furthermore, in FIG. 3B, the reset terminal of the counter 380 operates as the reset terminal of the timing signal generator 30'.

As described above, the $Q_C$ and $Q_B$ outputs have time periods of $\Delta t_F$ and $\Delta t_1$, respectively. Thus, a high-level signal may be obtained at a time $\Delta t_F+\Delta t_1$ after the counter 380 is reset by AND-ing the $Q_C$ and $Q_B$ outputs. Thus, the sync enable signal may be obtained by NAND-ing the $Q_C$ and $Q_B$ outputs, as illustrated in FIG. 3B.

Also, since the $Q_A$ output has a time period of $\Delta t_2$, a high-level signal may be obtained at a time $\Delta t_F+\Delta t_1+\Delta t_2$ after the counter 380 is reset by AND-ing the $Q_A$, $Q_B$, and $Q_C$ outputs. Therefore, the signal obtained by AND-ing the $Q_A$ output with an inverted version of the sync enable signal may be used for resetting the counter 380, as illustrated in FIG. 3B.

It will be readily apparent to those of ordinary skill in the art which specific Q-outputs of the counter 380 should be chosen as the $Q_A$, $Q_B$, and $Q_C$ outputs illustrated in FIG. 3B based on the desired flash rate and duration of the light. For example, the Q16, Q19, and Q21 outputs of the digital counter 380 may be used as the $Q_A$, $Q_B$, and $Q_C$ outputs, respectively. Using this configuration in conjunction with a 1 MHz precision oscillator 3110, a flash rate of approximately 45 flashes per minute and flash duration of approximately 295 ms can be achieved.

It should be noted that the timing signal generator 30' in FIG. 3B merely represents an exemplary implementation of the corresponding device in FIGS. 1 and 3. The present invention covers any other particular implementation of the timing signal generator 30 described above in connection with FIGS. 1 and 3, as will be contemplated by those of ordinary skill in the art.

In the exemplary embodiment described above in relation to FIG. 3 and 3B, the time window WDW is described as occurring before the "programmed" reset or rollover of counters 330-350 caused by the output of counter 330 in FIG. 3 (equivalent to the rollover of counter 380 in FIG. 3B caused by the AND-ed signal). However, the present invention also covers an alternative embodiment where the time window WDW is started just following this programmed reset or rollover, or at some other predetermined time during the flashing period of the light, as will be readily contemplated by those of ordinary skill in the art.

An exemplary embodiment of the present invention is directed to a system of flashing lights. Each of the lights may have a corresponding power supply device 1 for supplying power to the light from a common wild frequency power source 40 and regulating the flashing operation of the light via a timing signal. Further, all of the power supply devices 1 are simultaneously energized or switched on. Since the power supply devices 1 in the system reset their respective timing signals according to the same wild frequency power source signal, the present invention helps prevent the flash rate/duration of any one light from drifting too far with respect to the other lights. Accordingly, the system may achieve the visual effect of uniformity in the flashing of the lights, and thus be synchronized, without requiring additional signals to be transferred amongst the lights in order to synchronize the flashing.

The present invention may be implemented as part of the anti-collision light system on an aircraft, according to an exemplary embodiment. In such a system, each anti-collision light may be powered by the aircraft's wild frequency 115 VAC bus. In an anti-collision light system, possible locations for the lightheads include each wingtip, the top and/or bottom of the fuselage, and the tail. The anti-collision lights may be configured to flash at a rate of between 40 and 100 cycles per minute. It will be readily apparent to those of ordinary skill in the art how to implement the principles of the present invention in order to synchronize each anti-collision light on the aircraft in view of the description provided above.

While exemplary embodiments are described above, it should be noted that various modifications and variations may be made with respect to these embodiments without departing from the spirit and scope of the invention.

What is claimed is:

1. A power supply device for supplying power from a wild frequency source signal to a first flashing light, such that the first flashing light is synchronized to a second flashing light supplied by another power supply device from the same wild frequency source signal, comprising:

a timing signal generator configured to generate a timing signal based on a precision clock signal, the timing signal being used to regulate a flashing operation of the flashing light; and a synchronization device configured to cause the timing signal generator to reset the timing signal in accordance with the wild frequency source signal.

2. The power supply device of claim 1, wherein the synchronization device causes the timing signal generator to reset the timing signal in response to the wild frequency source signal aligning with the timing signal.

3. The power supply device of claim 1, wherein the synchronization device synchronizes the first flashing light to the second flashing light without signaling to or from the other power supply device.

4. The power supply device of claim 1, wherein the first and second flashing lights are anti-collision lights installed on an aircraft.

5. The power supply device of claim 1, wherein the synchronization device includes:

a reference pulse generator configured to generate a reference pulse based on the wild frequency source signal; and a reset signal generator configured to generate a reset signal if the reference pulse is generated during a time window defined according to the timing signal, the reset signal being sent to the timing signal generator to reset the timing signal.

6. The power supply device of claim 5, wherein the timing signal generator further comprises:

a timebase signal generator configured to generate a sync enable signal indicative of the time window, the sync enable signal being generated based on the clock signal.

7. The power supply device of claim 6, wherein the reset signal generator includes a latch configured to receive the sync enable signal in order to latch any reference pulse generated during the time window.

8. The power supply device of claim 6, wherein the timing and sync enable signals are reset at a predetermined time during each flash period.

9. The power supply device of claim 6, wherein the timing signal generator includes:

a precision oscillator configured to generate the clock signal; and a counter, the timing signal and sync enable signal being generated by the outputs of the counter.

10. A method for synchronizing two or more flashing lights, which are powered from a common wild frequency source, without synchronization signals between the two or more flashing lights, comprising:

for each of the two or more flashing lights, generating a local timing signal based on a precision oscillator clock signal generated locally for the flashing light, the local timing signal being used to regulate a flashing operation for the flashing light; and resetting the local timing signal in accordance with the wild frequency source signal.

11. The method of claim 10, wherein the local timing signal is reset when the wild frequency source signal coincides with the local timing signal.

12. The method of claim 10, wherein the two or more flashing lights are anti-collision lights installed on an aircraft.

13. The method of claim 10, wherein the resetting the local timing signal includes:

generating a reference pulse based on the wild frequency source signal;

generating a reset signal if the reference pulse is generated during a time window defined according to the local timing signal; and using the reset signal to reset the local timing signal.

14. The method of claim 13, further comprising:

generating a sync enable signal, which is indicative of the time window, based on the clock signal; and using the sync enable signal to generate the reset signal.

15. The method of claim 14, further comprising:

resetting the local timing signal and the sync enable signal after each flashing of the corresponding anti-collision light.

16. The method of claim 14, wherein the local timing signal and sync enable signal are generated by the outputs of a counter, which receives the clock signal.

17. A system comprising:

a wild frequency power source; and first and second flashing lights powered from a signal provided by the wild frequency power source, each operably connected to a precision-oscillator for generating a timing signal, wherein flashing operations of the first and second flashing lights are regulated in accordance with the respective timing signals; and the timing signals of the first and second flashing lights, respectively, are independently reset in accordance with the wild frequency source signal, thereby synchronizing the first and second flashing lights.

18. The system of claim 17, further comprising:

first and second timing signal generators configured to generate the timing signals for the first and second flashing lights, respectively; and first and second synchronization devices corresponding to the first and second timing signal generators, respectively, wherein each of the first and second synchronization devices is configured to:

detect alignment between the timing signal of the corresponding timing signal generator and the wild frequency source signal; and cause the timing signal of the corresponding timing signal generator to be reset when alignment is detected.

19. The system of claim 18, wherein each of the first and second synchronization devices are configured to:

generate a reference pulse based on the wild frequency source signal; and generate a reset signal if the reference pulse is generated during a time window defined according to the timing signal, the reset signal being used to reset the timing signal of the corresponding timing signal generator.

20. The system of claim 17, wherein the first and second flashing lights are installed as anti-collision lights of an aircraft.

* * * * *